United States Patent
Brooks et al.

Patent Number: 5,826,084
Date of Patent: Oct. 20, 1998

[54] MICROPROCESSOR WITH CIRCUITS, SYSTEMS, AND METHODS FOR SELECTIVELY BYPASSING EXTERNAL INTERRUPTS PAST THE MONITOR PROGRAM DURING VIRTUAL PROGRAM OPERATION

[75] Inventors: James E. Brooks, Addison; Robert R. Collins; Jonathan H. Shiell, both of Plano, all of Tex.

[73] Assignee: Texas Instruments Incorporated, Dallas, Tex.

[21] Appl. No.: 827,012

[22] Filed: Mar. 25, 1997

[51] Int. Cl.[6] .................................................. G06F 12/00
[52] U.S. Cl. ........................................... 395/677; 395/670
[58] Field of Search ................................. 395/677, 670, 395/678

[56] References Cited

U.S. PATENT DOCUMENTS

| | | | |
|---|---|---|---|
| 5,144,551 | 9/1992 | Cepulis | 395/425 |
| 5,303,378 | 4/1994 | Cohen | 395/700 |
| 5,644,755 | 7/1997 | Wooten | 395/500 |

*Primary Examiner*—Lucien U. Toplu
*Attorney, Agent, or Firm*—Robert D. Marshall, Jr.; James C. Kesterson; Richard L. Donaldson

[57] ABSTRACT

A microprocessor (26) may multi-task a plurality of programs, and those programs include a virtual program (38 or 40) operable in a virtual mode and a monitor program (34) operable using protected mode semantics. The microprocessor includes input circuitry (INTR) for receiving an external interrupt request signal corresponding to an external interrupt directed to the virtual program, and additional input circuitry (INT#0–7) for receiving an external interrupt number corresponding to the external interrupt directed to the virtual program. The microprocessor further includes an interrupt handling circuit (30) comprising circuitry for identifying an interrupt vector and presenting an interrupt corresponding to the external interrupt request number. Lastly, the microprocessor includes control circuitry (28) coupled to the interrupt handling circuit. The control circuitry includes circuitry for detecting receipt (48) of the external interrupt request signal, and circuitry (46), responsive to receipt of the external interrupt request signal and the external interrupt number, for providing a select signal to the interrupt handling circuit. The interrupt handling circuit identifies the interrupt vector using protected mode semantics (66) and presents an interrupt to the monitor program in response to the select signal comprising a first state, and the interrupt handling circuit identifies the interrupt vector using a second set of semantics (64) differing from the protected mode semantics and presents an interrupt to the virtual program in response to the select signal comprising a second state.

38 Claims, 5 Drawing Sheets

MICROPROCESSOR WITH CIRCUITS, SYSTEMS, AND METHODS FOR SELECTIVELY BYPASSING EXTERNAL INTERRUPTS PAST THE MONITOR PROGRAM DURING VIRTUAL PROGRAM OPERATION

TECHNICAL FIELD OF THE INVENTION

The present embodiments relate to microprocessor-based computer systems, and are more particularly directed to such systems including a microprocessor with circuits, systems, and methods for selectively bypassing external interrupts past the monitor program during virtual task operation.

BACKGROUND OF THE INVENTION

Microprocessor-based computer systems have become prolific at all levels of the public and private sector. Because of this success and popularity, computer programs likewise have inundated the market. Despite the countless advances in both computer hardware and software, many major microprocessor developers have greatly attempted to maintain backward compatibility between new hardware and older software, that is, permitting the newer microprocessors to achieve vastly improved performance with newer software, while still allowing those same microprocessors to operate with older software. In order to maintain compatibility in whole or in part, various complex considerations arise. The embodiments described below deal with certain of these complex considerations, including the combination of multi-tasking and interrupt handling in microprocessor-based computer systems.

Multi-tasking microprocessors are those allowing various programs, or even tasks as part of those programs, to run near-simultaneously, with each program being presented with an environment so that it appears to the task, and often to the computer user, as if the microprocessor is only running a single task. Note that it is stated above that these tasks run "near-simultaneously". In actuality, the microprocessor commonly gives temporary control to each separate task and stores the state of the non-operating tasks; however, the switching rate as well as the microprocessor operation speeds are so high that it typically appears to the computer user that the tasks are operating simultaneously.

Multi-tasking presents yet another level of complexity in the area of operating in different modes for different tasks, particularly in view of modes used for certain older software. For example, newer microprocessors often include at least two modes, a first mode or native mode allowing more advanced operations (e.g., to support multi-tasking) and a second mode to ensure that older software can run on newer microprocessors. For example, INTEL manufactured the original 8086 microprocessor many years ago, and that microprocessor used "real addressing" and, thus, 8086 programs were said to have run in real mode. Since that time, newer microprocessors have evolved into the 80286, the 80386, the 80486 and now a fifth generation, including the PENTIUM. The PENTIUM, as well as many of its predecessors, typically operates in a native mode referred to as the "protected mode", which allows complex data handling, privilege checking, and other features to better support multi-tasking. However, in order to also provide compatibility with programs written for the 8086 "real mode", these processors also include a "virtual mode", which is a hybrid of the protected and real modes. Presently, the virtual mode is entered by enabling the VM (virtual mode) flag in the Eflag register of the microprocessor. In its more recent x86 microprocessors, INTEL added an extension to its virtual mode, where this extension is often referred to as virtual 8086 mode extensions. As its name suggests, the virtual 8086 mode extensions is a further refinement of the virtual mode. More particularly, the virtual 8086 mode extensions are enabled in the PENTIUM by setting the VME bit in the CR4 control register. With the VME bit enabled, additional virtual interrupt flags in the Eflags register come into play. In all events, when operating in the virtual mode and its extensions, the 8086 program perceives that it has sole control of the microprocessor and expects it to operate in a mode comparable to the 8086. In general, the virtual mode permits one or more computer programs written for 8086 microprocessors to operate in conjunction with a monitor program (e.g., WINDOWS) on a more advanced x86 microprocessor under a multi-tasking environment. For example, many 8086 programs currently exist which will operate on more modem day 80486 or PENTIUM processors, where that 8086 program runs under the virtual mode (and therefore hereafter is referred to as a "virtual 8086 program") while the monitor program itself actually runs under the more advanced protected mode. The monitor program, therefore, acts as a conduit between the virtual 8086 program and the actual microprocessor to perform various emulation as known in the art. As explained below, however, this perception to the virtual 8086 program may cause operational inefficiencies, particularly in the context of interrupts as described below.

There are various types of interrupts, but they all have in common that they create a change of flow in the normal flow of computer program execution. Thus, microprocessors include some level of interrupt handling capability. However, when combined with differing modes of operation and/or multi-tasking capabilities, the interrupt control and handling capabilities are likely to become even more complicated because one task may use interrupts given certain expectations which, without some intervention, may adversely affect another task. For example, recall from above that under current INTEL systems a virtual 8086 program runs via communication with a monitor program, while the monitor program runs under the protected mode of the microprocessor. Consider further an instance where an external interrupt is issued to the microprocessor, with the typical expectation that the interrupt (assuming the external interrupt is not masked as known in the art) would interrupt the operation of the then running program. However, if the microprocessor is at that time running a virtual 8086 program under virtual mode and its extensions, then the interrupt is not passed directly to the virtual 8086 program. In other words, the received external interrupt does not at that point interrupt the virtual 8086 program. Instead, the monitor program intercepts the interrupt and acts accordingly. Typically, for example, the monitor program "reflects" the external interrupt to the virtual 8086 program as known in the art. In performing this action, recall that the monitor program is running under protected mode. Thus, the monitor program uses protected mode semantics in reflecting the external interrupt and, consequently, a large number of clock cycles (e.g., 200 or more) are used in performing this operation. Thus, for a single external interrupt, a significant amount of processor time is exhausted to process the interrupt in this manner. Moreover, for events or programs giving rise to intensive numbers of interrupts, the problem is multiplied with each additional external interrupt and, therefore, the inefficiency of additional spent clock cycles is imposed on microprocessor operation.

In view of the above, there arises a need to address the drawbacks of current systems and to provide a microprocessor with circuits, systems, and methods for reducing the inefficiencies of handling external interrupts received during virtual program operation.

SUMMARY OF THE INVENTION

The present embodiments relate to microprocessor-based computer systems, and are more particularly directed to such systems including a microprocessor with circuits, systems, and methods for selectively bypassing external interrupts past the monitor program during virtual program operation. The microprocessor may multi-task a plurality of programs, and those programs include a virtual program operable in a virtual mode and a monitor program operable using protected mode semantics. The microprocessor includes input circuitry for receiving an external interrupt request signal corresponding to an external interrupt directed to the virtual program, and additional input circuitry for receiving an external interrupt number corresponding to the external interrupt directed to the virtual program. The microprocessor further includes an interrupt handling circuit comprising circuitry for identifying an interrupt vector and presenting an interrupt corresponding to the external interrupt request number. Lastly, the microprocessor includes control circuitry coupled to the interrupt handling circuit. The control circuitry includes circuitry for detecting receipt of the external interrupt request signal, and circuitry, responsive to receipt of the external interrupt request signal and the external interrupt number, for providing a select signal to the interrupt handling circuit. The interrupt handling circuit identifies the interrupt vector using protected mode semantics and presents an interrupt to the monitor program in response to the select signal comprising a first state, and the interrupt handling circuit identifies the interrupt vector using a second set of semantics differing from the protected mode semantics and presents an interrupt to the virtual program in response to the select signal comprising a second state. Other circuits, systems, and methods are also disclosed and claimed.

DETAILED DESCRIPTION OF THE PREFERRED EMBODIMENTS

Figure 1:
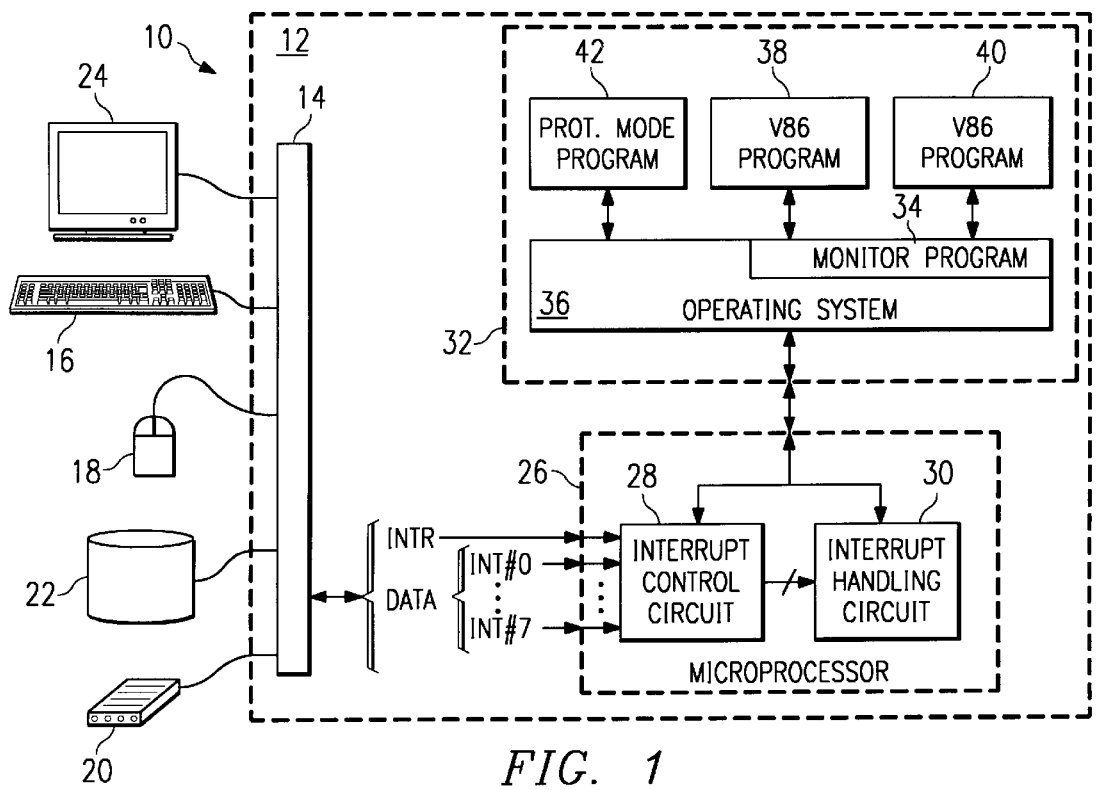
FIG. 1 illustrates a computer system in which the preferred embodiments are implemented, and includes a microprocessor with an interrupt control circuit and an interrupt handling circuit.

FIG. 1 illustrates a diagrammatic depiction of a computer system designated generally at 10, and of the type in which the present embodiments may be utilized. System 10 includes a computer 12, which includes various blocks described below. Note that numerous other blocks and interconnections could be included within computer 12, but for purposes of this embodiment they are not shown to simplify the discussion. Continuing, therefore, computer 12 includes an input/output interface 14 which is connected for communication with various peripherals. For example, computer 12 receives user input from various sources, such as a keyboard 16 and a mouse 18 or other pointing device. In addition, computer 12 may receive information from, or output information through, a modem 20. Modem 20 is shown as an external device for purposes of illustration but, of course, could be internal to the computer as known in the art. Computer 12 also bi-directionally communicates with a storage device 22, which may be either internal or external storage and actually may represent several different types of storage devices, including one or more of a floppy disk drive, a hard disk drive, an optical read/write device, and other such devices. Clearly, other input devices and sources are known in the art for communicating user data to computer 12. Lastly, computer 12 outputs information to a display 24 to communicate that information to the user and, while not shown, the information could be further output to a printer or alternative mechanism for providing meaningful information to the user.

Given the various peripherals identified above, note that various information is depicted in connection with input/output interface 14 which may be communicated from those devices to a microprocessor 26 within computer 12. Of particular relevance to the present embodiments, various peripherals may provide off-chip or external (i.e., outside of microprocessor 26) interrupt signals. In the example of FIG. 1, these signals include a single request signal designated INTR as well as an eight bit interrupt number signal designated INT#0 through INT#7. The INTR signal is preferably the same as in the 80×86 standard and is received on a separate external pin on microprocessor 26. As known in the art, the INTR signal represents a request from a peripheral to interrupt the operation of microprocessor 26. The values of INT#0 through INT#7 are commonly received along eight lines within a data bus, while that data bus typically is wider than eight lines (e.g., 32 lines with only 8 shown to simplify the drawing) and may also communicate other types of data as well as addresses. The values of INT#0 through INT#7 are also standard to the 80×86 art and combine to form an interrupt number identifying the particular type of interrupt being requested. For example, a serial interface like input/output interface 14 could issue an external interrupt request (i.e., INTR) to microprocessor 26 along with an interrupt number (i.e., INT#0 through INT#7) representing that the interface just received a character from keyboard 16. Note that this type of interrupt communication as well as the types of external interrupts are known in the art For example, the 80×86 architecture includes 256 such interrupts (numbered 0 through 255), and these interrupts are also referred to in the art as "hardware" interrupts. This is because these interrupts are typically set by hardware components or peripherals. Additionally, interrupts may be provided by a separate interrupt controller (i.e., external from the microprocessor) which receives and prioritizes interrupt information from various hardware, and then presents the interrupt request and number to the microprocessor. When microprocessor 26 receives this interrupt information, it is coupled to an interrupt control circuit 28 which further communicates with an interrupt handling circuit 30. In general, circuit 28 may serve many functions, but one is particularly noteworthy in the present embodiments. Specifically, interrupt control circuit 28 evaluates the particular external interrupt number and, in response, outputs a select signal to interrupt handling circuit 30. Interrupt handling circuit 30, in response to the select signal, sets up and presents the responsive interrupt; more particularly, the select signal causes interrupt handling circuit 30 to choose a particular type of semantics to perform the interrupt set up and presentation, and also directs interrupt handling circuit 30 to the recipient resource which will receive the interrupt presentation. Each of these operations is detailed below.

Microprocessor 26 is preferably a single chip microprocessor including the interrupt-related circuits set forth above. Clearly, however, microprocessor 26 may be of various different types which contemplate the features and functionality described with respect to FIGS. 1 through 7, and it will include various other components and interconnections; indeed, such aspects need not be detailed at this point but many other optional aspects are shown in greater detail below in connection with FIG. 8. At this point, however, note further that microprocessor 26 generally operates in a native or protected mode, and further supports a virtual mode (as well as its extensions) to be compatible with those modes as they are known in the 80×86 art. Thus, microprocessor 26 necessarily includes multi-tasking capabilities.

For purposes of illustration, microprocessor 26 responds to various levels of software control designated generally at 32, while other software may be induced but is not shown (e.g., BIOS control). Software control 32 includes an operating system 36. Within its native protected mode, microprocessor 26 is further operable to perform an emulation sub-mode, where the emulation sub-mode is preferably compatible with the virtual 8086 mode and its extensions of the 80×86 architecture. In this regard, it is known that a microprocessor operating in the virtual 8086 mode provides a certain level of hardware functionality which must be further augmented by a so-called monitor program (sometimes referred to as a virtual 8086 monitor). Thus, FIG. 1 further includes such a monitor program designated at 34. Typically, monitor program 34 is a type of system program which is part of the operating system and, therefore, it is shown in this manner in FIG. 1; in other words, it is anticipated that operating systems will be created with the virtual 8086 mode in mind and, therefore, will necessarily include a monitor program function to take advantage of the virtual 8086 mode. Clearly, however, the monitor program function could be separate and apart from the operating system. In either event, what characterizes monitor program 34 is that it operates between operating system 36 and one or more virtual 8086 programs to assist and provide the virtualization function. For purposes of illustration, therefore, FIG. 1 further includes two virtual 8086 programs designated at 38 and 40 which communicate with monitor program 34. Lastly, because microprocessor 26 may multi-task programs other than virtual 8086 programs, it is further shown by way of example that a separate protected mode program 42 communicates directly with operating system 36, with it understood therefore that program 42 is a program other than one running in the virtual 8086 mode.

Figure 2:
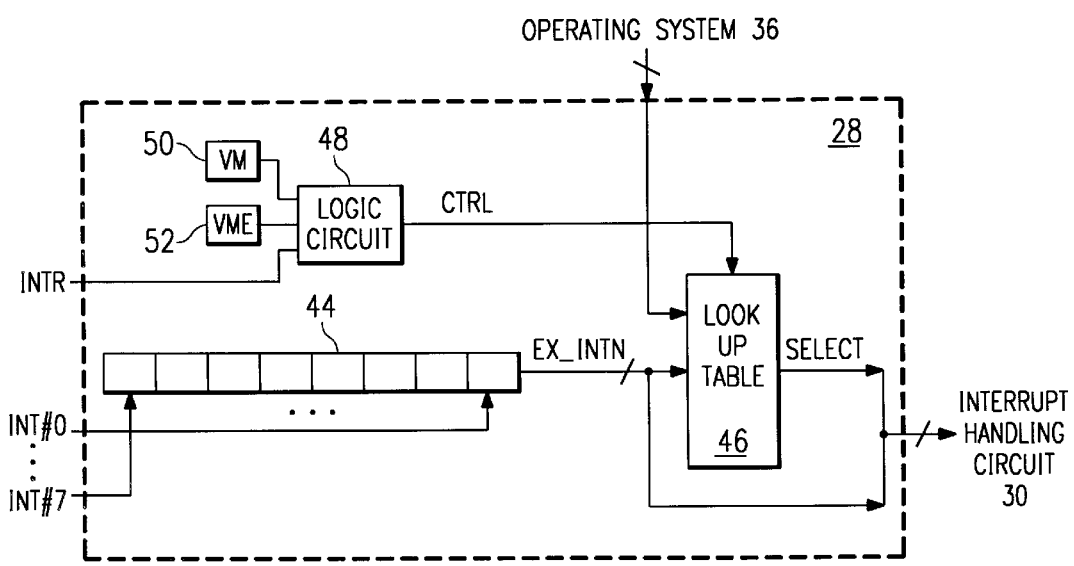
FIG. 2 illustrates a block diagram of various components of the interrupt control circuit of FIG. 1.

FIG. 2 illustrates additional details of the circuitry of interrupt control circuit 28 from FIG. 1. Circuit 28 includes the same input information as shown in FIG. 1 and, therefore, receives both the interrupt number signal INT#0 through INT#7 and the interrupt request signal INTR. The interrupt number signal INT#0 through INT#7 is connected to be stored to a register 44. Register 44 represents any type of storage capability for storing the eight bit interrupt number signal designated INT#O through INT#7. In the present embodiment, because the interrupt number is eight bits, obviously register 44 stores at least eight bits as well; however, a different size store would be used if the interrupt number signal were a different size (for example, if more than 256 interrupts were available, more than eight bits would be required). The interrupt number stored in register 44 (abbreviated "EX_INTN") is output to two different locations: (1) a look up table 46; and (2) interrupt handling circuit 30. The WNN1 interrupt request signal is coupled as one input to a logic circuit 48; logic circuit 48 includes the necessary logic to perform the logic operations described below given its inputs. Note further that the INTR interrupt request signal may be connected to other locations (e.g., to operating system 36 or interrupt handling circuit 30), but such additional connections are not shown to simplify the drawing and focus the following discussion on certain aspects of the preferred embodiments. A second input of logic circuit 48 is connected to a virtual mode ("VM") bit 50, while a third input of logic circuit 48 is connected to a virtual mode extensions ("VME") bit 52. The output of logic circuit 48 provides a control signal (abbreviated as "CTRL" on FIG. 2) to look up table 46. Particularly, logic circuit 48 determines when both VM bit 50 and VME bit 52 are set to indicate that microprocessor 26 is operating a particular virtual 8086 program (e.g., program 38 or 40 in FIG. 1) under virtual 8086 mode extensions. Thus, the output of logic circuit 48 may be thought of as a control signal to indicate whether or not the microprocessor is operating under virtual 8086 mode extensions and whether an external interrupt request (i.e., INTR) is received during that operation. The output of look up table 46 provides a select signal which is connected to interrupt handling circuit 30. Lastly, note that operating system 36 is connected to write information to look up table 46.

Figure 3:
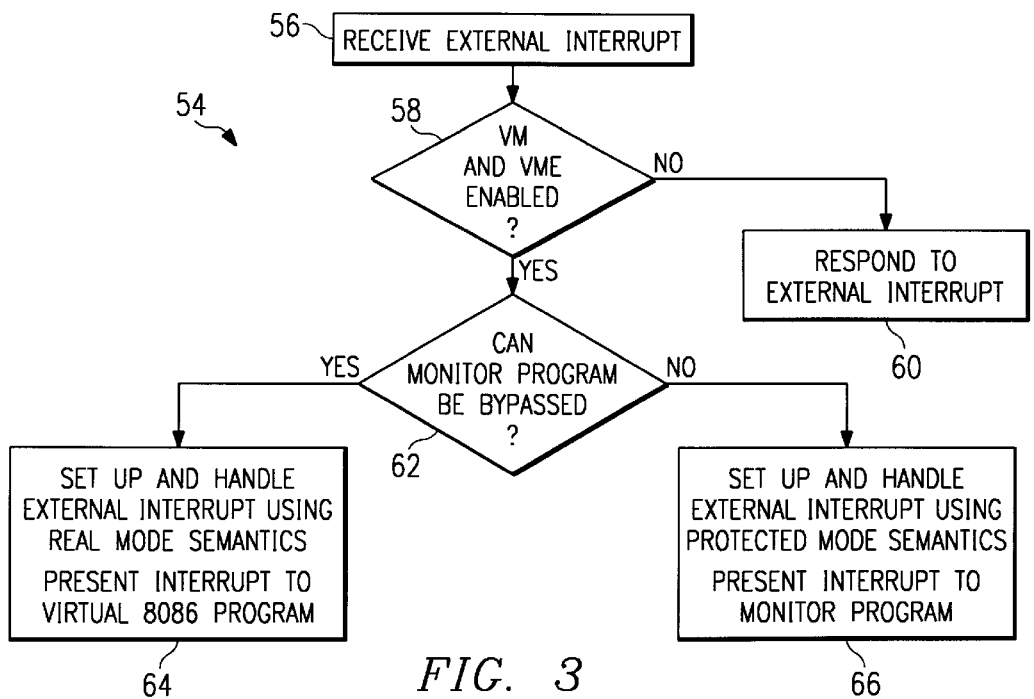
FIG. 3 illustrates a flow chart of the operational steps of the microprocessor in response to receiving an external interrupt.

FIG. 3 illustrates a flow chart of the operational steps for circuit 28 of FIG. 2 and, therefore, depicts a method designated generally at 54. Method 54 begins with step 56, where an interrupt request signal INTR is asserted and received by circuit 28. Without at this point going into a detailed discussion, note that in various microprocessors certain external interrupts are maskable as known in the art; that is, depending on other aspects of the microprocessor, it may be that the asserted external interrupt is masked from interrupting the microprocessor (i.e., the interrupt request is simply ignored). For example, this operation may occur with respect to the interrupt flag ("IF") bit. For more information on the masking of external interrupts, the reader is referred to U.S. Provisional Patent Application entitled , "Microprocessor With Circuits, Systems, And Methods For Interrupt Handling During Virtual Task Operation ", filed which is hereby incorporated herein by reference. Additionally, the masking of external interrupts is also addressed below in connection with FIGS. 4 through 7. To simplify the current discussion, however, it is assumed that the external interrupt is not masked in whatever fashion and, thus, the flow of method 54 continues to step 58.

Step 58 determines whether or not the microprocessor is operating under a particular mode, which in the preferred embodiment is the extension of its virtual mode. In circuit 28, this step is accomplished by logic circuit 48, which outputs a high control signal only if both VM bit 50 and VME bit 52 are asserted. Note that the VM and VME bits are used by way of illustration since they are known in current 80×86 microprocessors to indicate that a microprocessor is operating in an extension of its virtual 8086 mode; however, an alternative bit or bits could be used if those bits indicated that the microprocessor at issue were operating in the appropriate virtual mode. In other words, while the present embodiment discusses operation of subsequent steps during the extension of the virtual mode, those same steps could be used in an alternative microprocessor which defines its virtual mode in a different manner, and where that manner may or may not include an additional extension such as the extension of VM by VME. If the determination of step 58 is negative, the flow continues to step 60. On the other hand, if the determination of step 58 is positive, the flow continues to step 62.

Step 60 responds to the external interrupt request in whatever manner is then preferred. Specifically, the present embodiments are directed generally to the instance where the inquiry of step 58 is affirmative and, therefore, the present discussion need only focus from step 62 forward. Thus, because step 60 is reached when the inquiry of step 58 is negative, the microprocessor may respond in whatever fashion. For example, if the step 58 inquiry were negative, it may indicate that the microprocessor is not operating under a virtual mode at all and, therefore, the external interrupt would be handled according to whatever is the current mode (e.g., protected mode). Still other examples will depend on how the particular microprocessor responds when not in a virtual mode (or its extensions).

Step 62 evaluates the external interrupt number and can then direct the interrupt to be handled using one of two different sets of semantics, where the determination also causes the interrupt to be presented to one of two possible recipient types. Particularly, given the then-current operational state, step 62 determines whether the external interrupt currently being requested is able to bypass the monitor program so that it is not necessary for the monitor program to intercept and possibly reflect the requested interrupt to the virtual 8086 program using its protected mode semantics. If so, the flow continues to step 64. On the other hand, if for some reason, the external interrupt currently being requested should pass to the monitor program, the flow instead passes to step 66. Returning to circuit 28, note that step 62 is accomplished using look up table 46. Particularly, look up table 46 receives EX_INTN and includes the necessary circuitry, as described below, to look up an indicator corresponding to that requested external interrupt. The resultant indicator is preferably a single bit corresponding to the specific external interrupt number, and is output as the select signal to interrupt handling circuit 30. As shown below, based on the state of that bit (i.e., shown as the SELECT signal in FIG. 2), interrupt handling circuit 30 sets up the interrupt using one of two different types of semantics, and presents that interrupt to either a virtual 8086 program (e.g., program 38 or program 40) or to monitor program 34. Accordingly, the state of the bit is set in look up table 46 so that when it is one state (e.g., a logic 0), interrupt handling circuit 30 responds to the interrupt request using a first set of semantics and presents the interrupt to a first recipient, whereas when it is in an opposite state (e.g., a logic 1) interrupt handling circuit 30 responds to the interrupt request using a second set of semantics and presents the interrupt to a second recipient. Before proceeding with the actual choice of semantics and the recipient, note that look up table 46 is operable to receive any one of a possible number of interrupt numbers (e.g., 255 interrupt numbers) and, in response, determines the appropriate semantics and recipient for the requested interrupt To perform this functionality, various different approaches may be implemented. In the preferred embodiment, a bit map is used in memory to accomplish this functionality. The bit map is sufficient size either to store each of the possible interrupt numbers (e.g., 0 through 255) or be addressed according to those different numbers. In addition, for each of those numbers the bit map includes a bit which, when set to a first state directs interrupt handling circuit 30 to use a first set of semantics for a first recipient and when set to a second state directs interrupt handling circuit 30 to use a second set of semantics for a second recipient. The location of this bit map is preferably stored in a task state segment ("TSS") which, as known in the art, is pointed to by the TR register and identifies various information about the currently running task (other non-running tasks each have corresponding TSS information but, because they are not currently running, are not pointed to by the TR register). Thus, for a given virtual 8086 program, its corresponding TSS information would include the location of look up table 46 in memory for purposes of accomplishing the functionality described above. The actual location may be either in external or internal memory space. Note further that while this technique is the preferred technique, an alternative would be to include dedicated registers on the microprocessor where each bit within those registers corresponded to one of the possible total number of external interrupts, and the state of each bit again directs interrupt handling circuit 30 to one of two sets of semantics and a corresponding recipient. Still other techniques will be ascertainable by a person skilled in the art.

In addition to the various manners in which the functionality of look up table 46 may be performed, note that the actual values of the select bits within the table may be altered during processor operation according to various different considerations. Particularly, note that look up table 46 is shown as coupled to receive information from operating system 36. Thus, operating system 36 may, whenever desirable, change the value of any select bit within the table, so that in one instance a given external interrupt may be directed for response by interrupt handling circuit 30 using a first set of semantics while in another instance a given external interrupt may be directed for response by interrupt handling circuit 30 using a second set of semantics. Note that the particular instances in which the select bit is set to either one or the other state will depend on various considerations as will be ascertainable by a person skilled in the art.

In step 64, interrupt handling circuit 30 sets up and handles the requested external interrupt using a second semantics other than the complex protected mode semantics which would be used by monitor program 34. In the preferred embodiment, this second set of semantics is compatible with that which is normally used for real mode operation and extends the virtual 8086 mode by adding an interrupt handling capability. Thus, in step 64, on-chip circuitry locates the appropriate interrupt vector. In the preferred embodiment, this occurs by multiplying the interrupt number (i.e., EX_INTN) times four and performing the remaining real mode steps. In other words, steps which would be taken under real mode to set up the interrupt are taken, such as pushing the current state of the machine (e.g., code segment, instruction pointer, and flags register) and identifying and loading the appropriate code segment and instruction pointer which identify the first instruction to perform the interrupt Note that by stating above that the preferred semantics are compatible with the real mode operation it is intended that the preferred semantics operate such that the virtual 8086 program perceives operation to occur purely in real mode semantics, while in fact additional operations not detectable by the virtual 8086 program may occur such as protected mode page translation on the "real mode" address. Lastly, once these semantics are used to prepare the interrupt handler, the hardware presents the interrupt to the virtual 8086 program as the recipient of the interrupt; in other words, the hardware executes the interrupt vector and then directly resumes the virtual 8086 program upon completion of that interrupt handler. In the preferred embodiment, this hardware accomplishes the resumption of the virtual 8086 program by re-loading the state of the microprocessor as it was stored in order to prepare and execute the requested external interrupt Note further that the particular circuitry involved with interrupt handling circuit 30 may be of any of various different known circuits for accomplishing the functions set forth above.

In step 66, and in contrast to step 64, interrupt handling circuit 30 sets up and handles the requested external interrupt using protected mode semantics as in the prior art. Here, once the protected mode semantics are used to prepare the interrupt handler, the hardware presents the interrupt to monitor program 34 as the recipient of the interrupt; in other words, the hardware executes the interrupt vector and then directly resumes monitor program 34 upon completion of that interrupt handler. Again in the preferred embodiment, the hardware accomplishes the resumption of monitor program 34 by re-loading the state of the microprocessor as it was stored in order to take the requested external interrupt. Further, again note that the particular circuitry involved with interrupt handling circuit 30 may be of any of various different known circuits for accomplishing the functions set forth above.

From the above, one skilled in art may appreciate various benefits of the present embodiments. For example, a microprocessor in accordance with the various embodiments may efficiently handle various external interrupts with a reduced amount of monitor program intervention. In contrast, recall that in the prior art, an external interrupt is always intercepted by the monitor program and, thereafter, the monitor program may expend considerable clock cycles reflecting the external interrupt to the virtual 8086 program. Given certain virtual 8086 programs, therefore, performance increases may vary from modest to significant depending on the number of external interrupts which may be handled directly using real mode compatible semantics and resuming operation of the virtual 8086 program rather than the increased number of clock cycles used by a monitor program to reflect the interrupt under the protected mode.

Having described the above, the following also addresses additional considerations which may arise based on microprocessors which are compatible in part or in whole with the INTEL 80x86 microprocessors. Specifically, and as is known, current INTEL 80x86 microprocessors include an IF bit in the Eflags register of the microprocessor. If the IF bit is set in a given state (e.g., a logic 0), then any maskable external interrupt arriving on the INTEL pin will be ignored by the INTEL microprocessor. Indeed, faced with this limitation, INTEL added to the Eflags register in its more recent microprocessors a separate architected bit known as the virtual interrupt flag ("VIF") bit. Given the additional VIF bit, code within the INTEL format must determine whether a virtual program is running in an 8086 virtual mode extension. If the microprocessor is operating under 8086 virtual mode extension, when that virtual program attempts to manipulate the IF bit (e.g., by issuing either a CLI or STI instruction) the code must instead prevent the change to the IF bit from occurring and, alternatively, alter the VIF bit. Thereafter, during operation under 8086 virtual mode extension, the VIF bit rather than the IF bit is used to control interruption of the virtual 8086 program. Particularly, if the VIF bit is cleared, then a subsequently received external interrupt or an emulated interrupt will not then be presented to the then-executing virtual 8086 program. Instead, the external interrupt or an emulated interrupt is pended to the virtual 8086 program, that is, a virtual interrupt pending ("VIP") bit is set by the monitor program indicating that the interrupt is pending for the virtual 8086 program so that the interrupt may be handled once the virtual 8086 program again begins accepting external interrupts (i.e., once the VIF bit is later switched from a cleared state to a set state). Given the additional inhibiting and pending functions provided by these bits or by comparable control signals from other microprocessors such as that described in the above-referenced and incorporated patent application, the embodiments of FIGS. 2 and 3 above are further enhanced as shown below to further accommodate such control signals.

Figure 4:
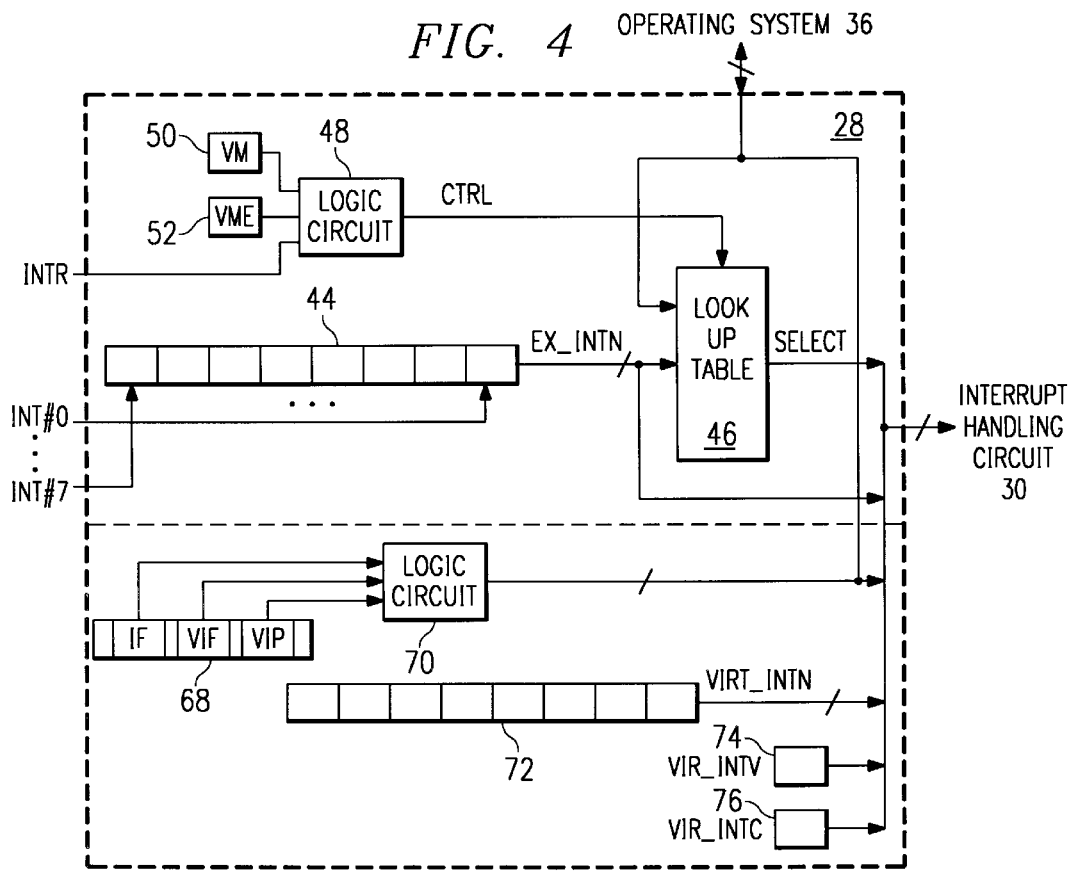
FIG. 4 illustrates the block diagram of FIG. 2 with additional components for evaluating and responding based on whether the microprocessor and the virtual 8086 program are currently accepting external interrupts.
Figure 6:
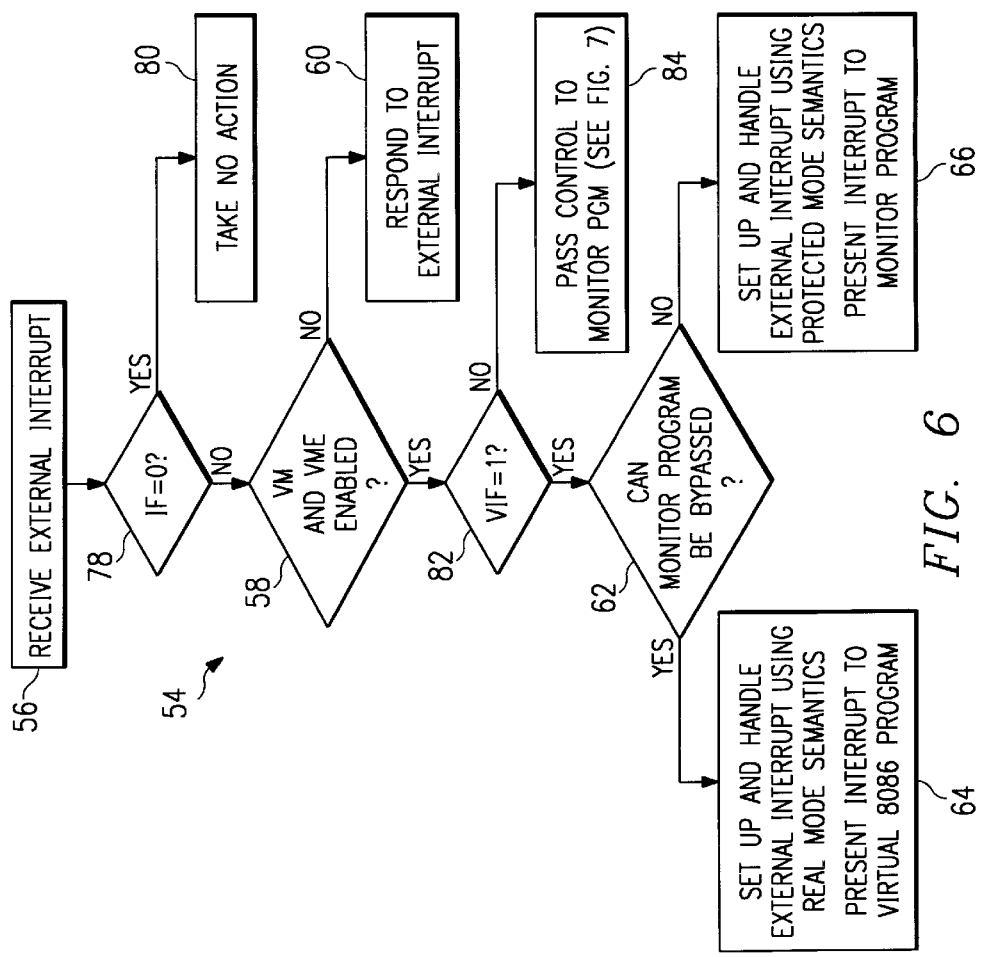
FIG. 6 illustrates the flow chart of FIG. 5 with additional steps to evaluate and respond to the state the microprocessor virtual interrupt flag bit.

FIG. 4 illustrates interrupt control signal 28 of FIG. 2, but with additional circuitry as described below. For purposes of comparison between FIGS. 2 and 4, a dashed line is included within FIG. 4 where the components above the dashed line are the same as those in FIG. 2 (which also use the same reference numerals), while the components below the dashed line are additions as follows. Looking then below the dashed line in FIG. 4, the additional circuitry includes a register 68 which corresponds to the Eflag register in the 80x86 architecture. The Eflag register 68 may include various bits written by operating system 36 (although the connection is not shown to simplify the diagram), where those bits represent the state of a current task. While the Eflag register typically includes many bits which are not otherwise shown, three of the Eflag bits are particularly relevant to external interrupt techniques and, therefore, are shown in register 68. As mentioned above, these three bits include the IF bit, the VIF bit, and the VIP bit. For purposes of clarity to person skilled in the art, these bit names are the same as those used in the INTEL Pentium microprocessor, but it should be understood that such usage is not intended as a limitation since the functionality of those bits differs in certain respects from the INTEL usage as evident below.

Continuing with FIG. 4, it includes a logic circuit 70. Logic circuit 70 includes the necessary logic functions to evaluate and compare the values of the IF, VIF, and VIP bits to achieve the functions set forth below. The results output by logic circuit 70 are output to both interrupt handling circuit 30 and operating system 36. FIG. 4 further includes a total of ten additional bits of information written by operating system 36 and, more particularly, by monitor program 34 (again, the connections to these bits from operating system 36 is not shown to simplify the diagram). These values are used by interrupt handling circuit 30 as described below. Turning now to the specific bits, they include a set of eight bits stored in a register 72, as well as individual bits stored in registers 74 and 76. The eight bit register 72 stores the value of the interrupt number to be presented to a virtual 8086 program. For convenience, therefore, this value is referred to as a virtual interrupt number and is represented by the abbreviation VIRT_INTN. As appreciated below, this value becomes useful when an external interrupt is pending for a virtual 8086 program. Bit registers 74 and 76 also include information used when an external interrupt is pending for a virtual 8086 program. Bit register 74 stores a value abbreviated as VIR_INTV. The value of VIR_INTV indicates whether the value in register 74 (i.e., VIRT_IN_N) should be considered valid. Lastly, bit register 76 stores a value abbreviated as VIR_INTC. The value of VIR_INTC determines, as detailed below, the flow of control from microprocessor 26 to either execute an interrupt vector or pass control back to monitor program 34 after the interrupt vector has been set up.

The operation of the circuit of FIG. 4 is best understood by first considering the various combinations of the IF and VIF bits. Recall from the above discussion that the IF and VIF bits are used to mask interrupts from reaching the microprocessor hardware and the virtual 8086 program, respectively. Thus, given the additional considerations of having to accommodate these bits, Table 1 below illustrates the four possible combinations of these bits, and assigns each an instance number for purposes of the following discussion. Note further that logic circuit 70 of FIG. 4 is able to determine which instance is occurring because it includes both the IF and VIF bits at its inputs. Thus, the actions taken in response to those bits may occur in response to the output(s) of logic circuit 70.

TABLE 1

| IF | VIF | Instance Number |
|---|---|---|
| 0 | 1 | 1 |
| 0 | 0 | 2 |
| 1 | 1 | 3 |
| 1 | 0 | 4 |

Figure 5:
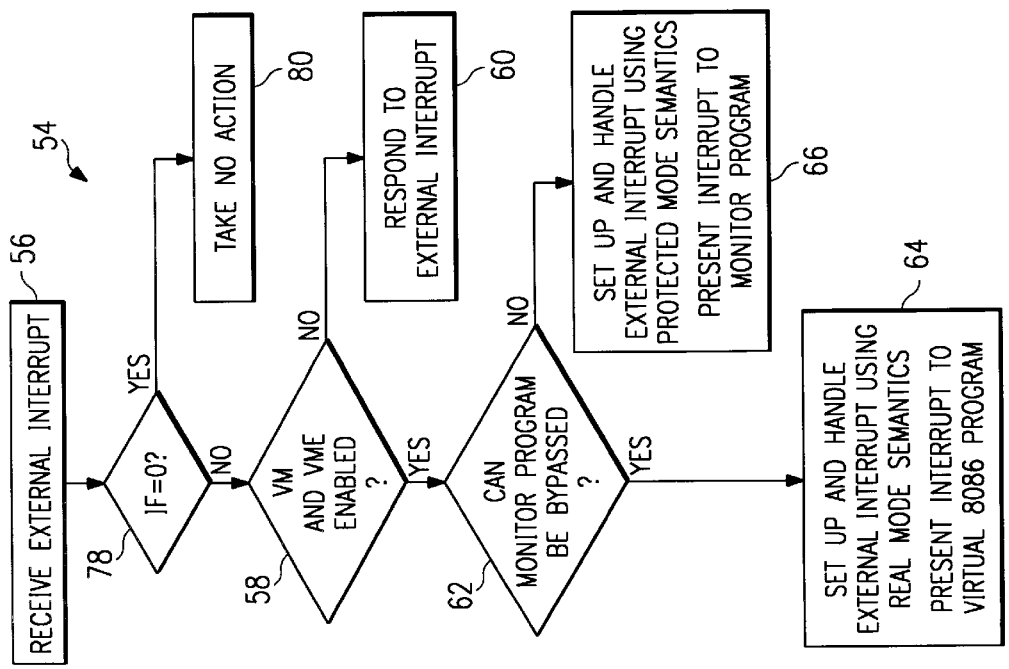
FIG. 5 illustrates the flow chart of FIG. 3 with additional steps to evaluate and respond to the state of the microprocessor interrupt flag bit.

In instance numbers 1 and 2 of Table 1, the IF bit is cleared, thereby indicating that the microprocessor is not accepting (i.e., is masking) any external interrupt. To demonstrate the operation of microprocessor 26 in either of these instances, FIG. 5 illustrates a flow chart which modifies the flow chart of FIG. 3. Particularly, FIG. 5 commences in the same manner as FIG. 3, where step 56 receives an external interrupt. However, a new step 78 is inserted between steps 56 and 58. In step 78, the value of the IF bit (or whatever appropriate mask control signal) is evaluated and, if set to mask an external interrupt (e.g., set to a logic 0), then the flow continues to step 80. On the other hand, if the value of the IF bit is set to the opposite state, the flow continues to step 58, and proceeds from that point forward in the same manner as described above. Note that logic circuit 70 may be used to evaluate the IF bit in this manner and provide an appropriate control signal in response to its evaluation.

Step 80 preferably takes no action with respect to the external interrupt request since the masking function was established to a state to inhibit any external interrupt from having an effect on the current microprocessor operation. Thus, note that when external interrupts are inhibited, look up table 46 need not be reached and the requested interrupt does not affect either interrupt handling circuit 30 or monitor program 34. Note that the particular circuit implementation to accomplish this inhibit function is purely a matter of design choice. For example, in FIG. 4, the output of logic circuit 70 could connect an appropriate control signal to interrupt handling circuit 30 for this purpose. Specifically, recall from above that normally interrupt handling circuit 30 is responsive to the recently received external interrupt request signal, that is, interrupt handling circuit 30 is indirectly responsive because it identifies an interrupt vector and presents an interrupt after INTR and EX_INTN are received. In step 80, however, the control signal from logic circuit 70 would inhibit interrupt handling circuit 30 from responding to the INTR and/or EX_ININ signals. Further, various other techniques will be ascertainable by a person skilled in the art.

In instance numbers 3 and 4 of Table 1, the IF bit is set, thereby indicating that the microprocessor in general may receive external interrupts. At this point, the value of the VIF bit then controls the possible next course of action. Accordingly, FIG. 6 further modifies FIG. 5, and shows a new step 82 following step 58 from FIG. 5. Note that step 82 is reached because IF equals 1 and the microprocessor is running in the extensions of its virtual mode, and then the value of the VIF bit is evaluated to determine the next course of action. Particularly, if VIF is also set, then the virtual 8086 program is also accepting external interrupts. Consequently, again the flow may continue to step 58 as shown in the Figure and, again, look up table 46 may be consulted and the appropriate action taken as described above (i.e., either bypassing monitor program 34 and handling the interrupt using real mode compatible semantics and presenting it to a virtual 8086 program or handling the interrupt using protected mode semantics and presenting it to monitor program 34). On the other hand, if VIF is not set, then the virtual 8086 program is not at that point accepting external interrupts. In the present embodiments, therefore, the flow continues to step 84.

Step 84 passes control to monitor program 34. Note in FIG. 4 that this may occur by communicating a control signal from logic circuit 70 to operating system 36 (i.e., to monitor program 34 as a part of operating system 36). In the present embodiment, monitor program 34 may respond in one of two manners. As a first option, because the virtual 8086 program is not at that point accepting external interrupts, monitor program 34 may simply respond in whatever desired manner, such as reflecting the interrupt to the virtual 8086 program once it later is accepting external interrupts according to known principles (i.e., once the value of VIF is set). For example, in this instance, monitor program 34 may communicate with interrupt handling circuit 30 so that the circuit identifies the appropriate interrupt vector using protected mode semantics. As a second and preferred option, the additional circuitry below the dashed line of FIG. 4 may be used as further detailed in connection with FIG. 7, below.

Figure 7:
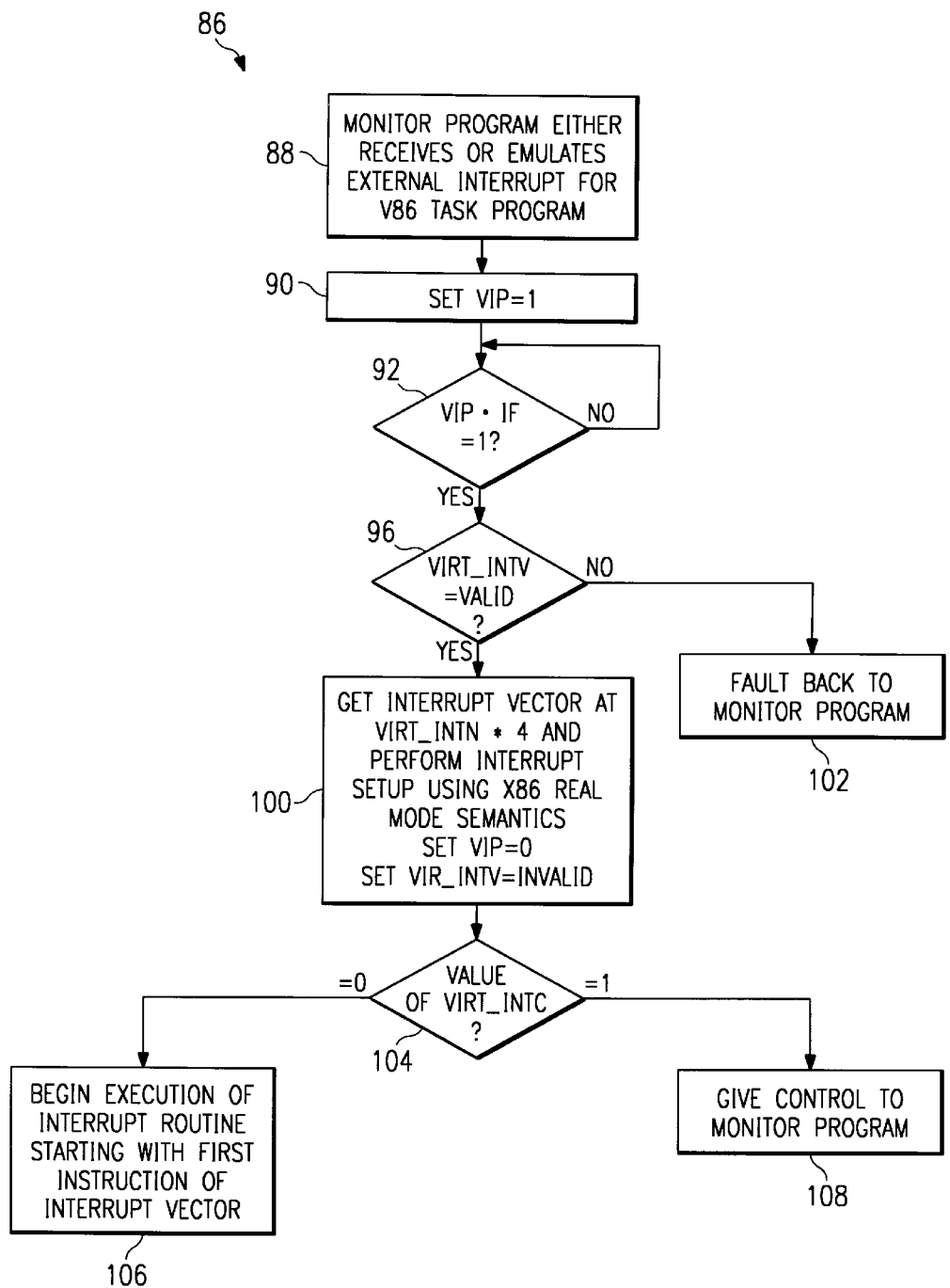
FIG. 7 illustrates a flow chart for operation of circuitry on the microprocessor to set up an interrupt vector using real mode semantics in response to determining that an external interrupt is pending for the virtual 8086 program.

FIG. 7 illustrates a preferred method 86 of operation for the lower half of FIG. 4, when the microprocessor is accepting external interrupts but the virtual 8086 program is not. Generally, note that method 86 operates to use circuitry on the microprocessor which, using real mode compatible semantics, sets up the interrupt vector to be executed in response to the external interrupt. Thus, method 86 begins with step 88 where monitor program 34 receives the external interrupt for which action must be taken. As an example of an actual external interrupt, assume virtual 8086 program 38 earlier required an access to storage device 22 by way of an interrupt and that access is now complete. Storage device 22 may now respond (either directly or through some other device) with its own interrupt to indicate completion of the access. Again, therefore, a signal will be asserted to the INTR pin of microprocessor 26 along with an interrupt number which will pass to register 44 of interrupt control circuit 28. Thus, in step 88, monitor program 34 is aware of this actual interrupt and places an appropriate interrupt number value into register 72 (although this number could also be generated by on-chip hardware rather than monitor program 34). Note that this value is that which is determined by the monitor program as appropriate given the then-current operations and may not be the same number which was received as an external interrupt number (i.e., VIRT_INTN may not necessarily be the same as the received value of EX_INTN). In addition, monitor program 34 sets the value of bit register 74 (i.e., VIRT_INTV) to indicate that the contents of register 72 are valid.

In step 90, and having received an external interrupt in step 88, the method (preferably by monitor program 34, although the on-chip circuitry of interrupt handling circuit 30 could be used as an alternative) sets the VIP bit of register 68 to a state indicating that an external interrupt is pending for the virtual 8086 program.

After step 90, in the preferred embodiment monitor program 34 passes control to interrupt handling circuit 30. Thus, interrupt handling circuit 30 includes the necessary circuitry to accomplish the following steps, except where control is passed back to monitor program 34. Consequently, these operations occur as a result of structure on the microprocessor chip. Thus, the following steps may be accomplished, for example, using microcode, a state machine, a combination of the two, or by alternative structure which may be ascertained by a person skilled in the art. In all events, by including such on-chip support, performance is increased. Note further that circuit 30 is shown as a separate item within FIG. 2 only for purposes of discussing its functionality, while it should be understood that in actuality its functions may be accomplished in part using existing architecture located across the microprocessor, such as its ALU for logic functions, its microcode ROM for any microcode operations, and so forth.

Step 92 determines whether the virtual 8086 program is accepting external interrupts. Particularly, recall that the virtual 8086 program may dear the value of the VIF bit to a logic 0 when it does not want to receive an external interrupt Thus, using the output of logic circuit 70, step 92 may repeatedly evaluate the combination of VIP·VIF. VIP was already set in step 90. However, VIF should only be set by the 8086 virtual program to a logic 1 only once that program is again ready to accept an external interrupt. Thus, step 92 remains in a loop until VIF is set in this manner. Once VIF is set, it is then known both that a virtual interrupt is pending for the virtual 8086 program, and that the virtual 8086 program is allowing an interrupt to be taken by the microprocessor; in other words, the output of logic circuit 70 in this instance may be thought to include a "take virtual interrupt request" to interrupt handling circuit 30, that is, a request that the now pending virtual interrupt is acceptable to take because the virtual 8086 task has set the VIF bit. Thus, when interrupt handling circuit 30 receives this take virtual interrupt request, the flow continues to step 96.

Step 96 evaluates the value of bit register 74 (i.e., VIRT_INTV) which, recall from above, indicates whether the value in register 72 (i.e., VIRT_INTN) is valid. Recall from step 88, above, the value of VIRT_INTV at this point should indicate a valid state assuming it has not been changed since step 88. Thus, assuming no intervening event has occurred which set the value of VIRT_INV to invalid, the flow continues to step 100. To the contrary, if VIRT_INTV has been changed to invalid, the flow continues to step 102. In step 102, an exception is taken back to monitor program 34. In the preferred embodiment, this exception is a general protection fault which is detected by monitor program 34 which must then evaluate the immediately preceding events and act accordingly. Given the ability to fault back to monitor program 34 in this manner, note that VIRT_INTV can be set to invalid for whatever reason if control is desired to fault back to monitor program 34 in step 102. For example, some programs may have the ability to modify the IDTR register available in certain 80×86 microprocessors; this case, the step of locating the interrupt vector described below in step 100 may cause inaccurate results. Thus, in that particular instance, it may undesirable to allow step 100 to occur and, instead, VIRT_INTV is set to invalid prior to that time. As a result, instead of the calculation of step 100, the fault of step 102 will occur, thereby returning control back to monitor program 34. Note also that rather than returning control back to monitor program 34, an alternative embodiment would include an additional register and/or control so that a corrected base value could be determined based on the effect of the IDTR register. In this event, the corrected base value could then be used and the location of the interrupt vector described below could be achieved without having to fault back to the monitor program.

Step 100 completes the set up for actually executing the first instruction of the interrupt vector. Thus, in step 100, the on-chip method locates the appropriate interrupt vector. In the preferred embodiment, this occurs by multiplying the interrupt number for the virtual 8086 program (i.e., VIRT_INTN) times four and performing the interrupt using real mode compatible semantics. Again, therefore, steps which would be taken under real mode to setup the interrupt are taken, such as pushing the current state of the machine (e.g., code segment, instruction pointer, and flags register) and identifying and loading the appropriate code segment and instruction pointer which identify the first instruction to perform the interrupt In addition to locating the interrupt vector, step 100 also clears the VIP bit since the particular interrupt intended for the virtual 8086 program is set up to be performed and will, therefore, no longer be pending. Step 100 also sets the VIR_INTV bit to invalid so that any later step may evaluate that bit and know not to rely upon the value in register 72 until it has been written with a new value and the state of VIR_INTV has been returned to valid.

Step 104 permits a last chance for monitor program 34 to prevent the on-chip routine from commencing execution of the interrupt instructions. Particularly, step 104 evaluates the value of bit register 76 (i.e., VIR_INTC). If VIR_INTC is set to a particular state (e.g., a logic 0), the flow continues to step 106. On the other hand, if VIR_INTC is set to an opposite state (e.g., a logic 1), the flow continues to step 108. Step 108 passes control back from the on-chip routine to monitor program 34. Thus, in an instance where monitor program 34 desires control of the microprocessor without the current interrupt being executed, it may set the value of VIR_INTC in the interim so that steps 104 and 108 return control back to monitor program 34. This operation could occur whenever desirable. For example, monitor program 34 may have more than one interrupt pending and, therefore, desire control to set up another interrupt In this regard, note that the dedicated hardware for performing steps 92 through step 100 may be used one or more successive times by faulting back to monitor program 34 and, in each instance, setting up another interrupt (i.e., going through the steps above through the step of identifying the appropriate interrupt vector, pushing the current information and identifying and loading the information to begin executing the interrupt vector). Still other examples will be ascertainable by a person skilled in the art. In any event, again the passage of control may be accomplished by way of an exception, and here the exception preferably indicates that control is passed to monitor program 34 due to the setting of VIR_INTC.

Step 106 completes the handling of the interrupt to be presented to the virtual 8086 program by begin execution of the interrupt routine by executing the first instruction in the interrupt vector. Thus, the interrupt is performed from this point forward according to known principles and, therefore, may conclude according to such principles and depending upon the particular interrupt being performed.

Note from the above that steps 92, 96, 100, 104, and 106 allow on chip setup and execution of the requested interrupt handler in response to the output of logic circuit 70 and further due to the various information provided by register 72 as well as bit registers 74 and 76. While this operation is preferred, an alternative embodiment would replace those steps and have the output of logic circuit 48 pass control back to monitor program 36 which, at that point, could evaluate the current state and emulate the virtual interrupt according to known techniques.

Figure 8:
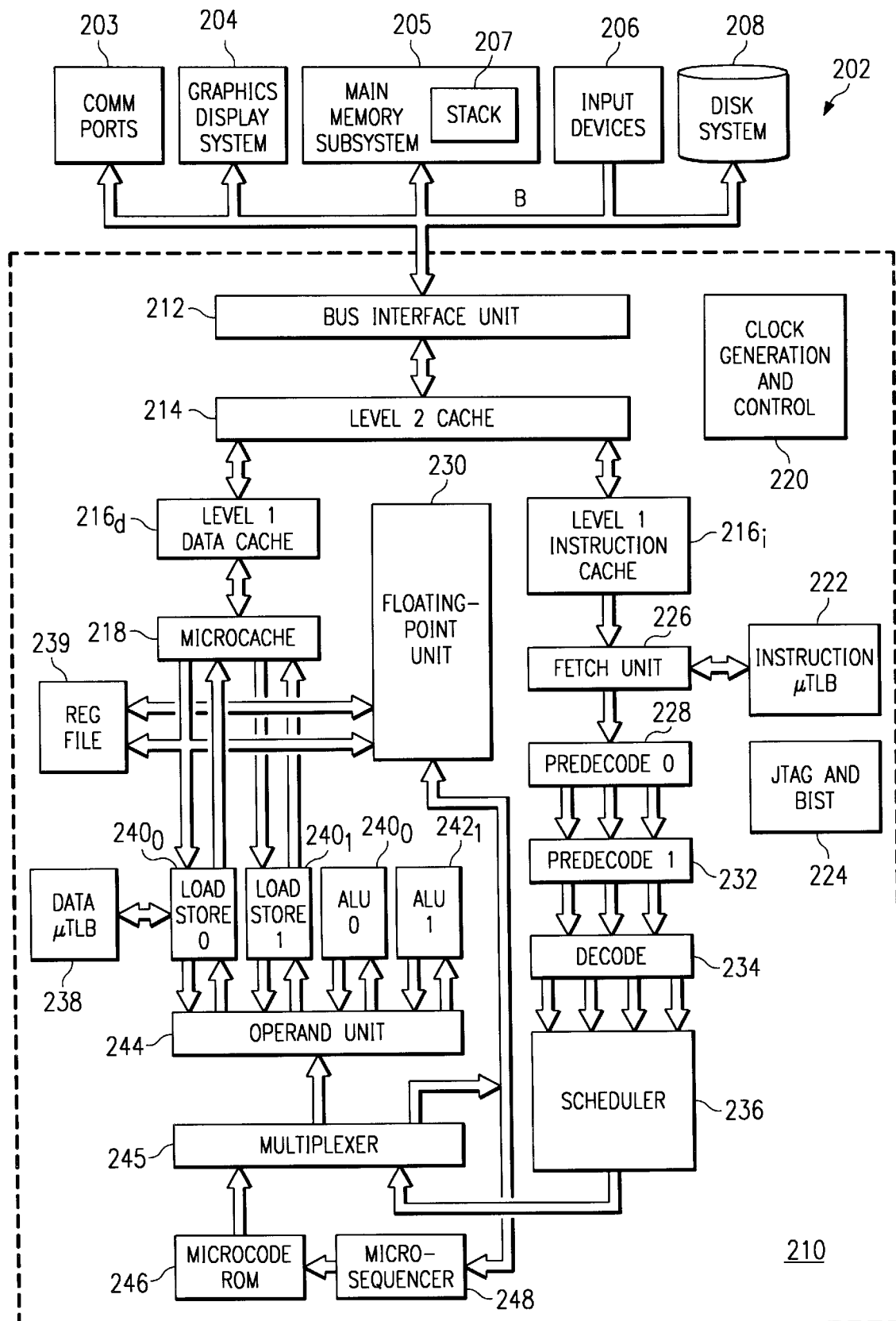
FIG. 8 illustrates an exemplary data processing system within which the preferred embodiments may be implemented.

Having described the above embodiments, FIG. 8 illustrates a block diagram of a microprocessor embodiment into which the above embodiments may be incorporated. Referring now to FIG. 8, an exemplary data processing system 202, including an exemplary superscalar pipelined microprocessor 210 within which the preferred embodiment is implemented, will be described. It is to be understood that the architecture of system 202 and of microprocessor 210 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 210, as shown in FIG. 8, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 202 contains such conventional subsystems as communication ports 203 (including modem ports and modems, network interfaces, and the like), graphics display system 204 (including video memory, video processors, a graphics monitor), main memory system 205 which is typically implemented by way of dynamic random access memory (DRAM) and includes a stack 207, input devices 206 (including keyboard, a pointing device, and the interface circuitry therefor), and disk system 208 (which may include hard disk drives, floppy disk drives, and CD-ROM drives). It is therefore contemplated that system 202 of FIG. 8 corresponds to a conventional desktop computer or workstation, as are now common in the art. Of course, other system implementations of microprocessor 210 can also benefit from the present embodiments, as will be recognized by those of ordinary skill in the art.

Microprocessor 210 includes a bus interface unit ("BIU") 212 that is connected to bus B, and which controls and effects communication between microprocessor 210 and the other elements in system 202. BIU 212 includes the appropriate control and dock circuitry to perform this function, including write buffers for increasing the speed of operation, and including timing circuitry so as to synchronize the results of internal microprocessor operation with bus B timing constraints. Microprocessor 210 also includes clock generation and control circuitry 220 which, in this exemplary microprocessor 210, generates internal dock phases based upon the bus clock from bus B; the frequency of the internal dock phases, in this example, may be selectably programmed as a multiple of the frequency of the bus clock.

As is evident in FIG. 8, microprocessor 210 has three levels of internal cache memory, with the highest of these as level 2 cache 214, which is connected to BIU 212. In this example, level 2 cache 214 is a unified cache, and is configured to receive all cacheable data and cacheable instructions from bus B via BIU 212, such that much of the bus traffic presented by microprocessor 210 is accomplished via level 2 cache 214. Of course, microprocessor 210 may also effect bus traffic around cache 214, by treating certain bus reads and writes as "not cacheable". Level 2 cache 214, as shown in FIG. 8, is connected to two level 1 caches 216; level 1 data cache $216d$ is dedicated to data, while level 1 instruction cache 216i is dedicated to instructions. Power consumption by microprocessor 210 is minimized by only accessing level 2 cache 214 only in the event of cache misses of the appropriate one of the level 1 caches 216. Furthermore, on the data side, microcache 218 is provided as a level 0 cache, which in this example is a fully dual-ported cache.

As shown in FIG. 8 and as noted hereinabove, microprocessor 210 is of the superscalar type. In this example multiple execution units are provided within microprocessor 210, allowing up to four instructions to be simultaneously executed in parallel for a single instruction pointer entry. These execution units include two ALUs $244_0$, $244_2$ for processing conditional branch, integer, and logical operations, floating-point unit (FPU) 230, two load-store units $240_0$, $240_1$, and microsequencer 248. The two load-store units 240 utilize the two ports to microcache 218, for true parallel access thereto, and also perform load and store operations to registers in register file 239. Data microtranslation lookaside buffer ($\mu$TLB) 238 is provided to translate logical data addresses into physical addresses, in the conventional manner.

These multiple execution units are controlled by way of multiple pipelines with seven stages each, with write back. The pipeline stages are as follows:

F Fetch: This stage generates the instruction address and reads the instruction from the instruction cache or memory PDO Predecode stage 0: This stage determines the length and starting position of up to three fetched x86 -type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back: This stage stores the results of the execution in registers or in memory Referring back to FIG. 8, the pipeline stages noted above are performed by various functional blocks within microprocessor 210. Fetch unit 226 generates instruction addresses from the instruction pointer, by way of instruction micro-translation lookaside buffer ($\mu$TLB) 222, which translates the logical instruction address to a physical address in the conventional way, for application to level 1 instruction cache $216_i$. Instruction cache $216_i$ produces a stream of instruction data to fetch unit 226, which in turn provides the instruction code to the predecode stages in the desired sequence. Speculative execution is primarily controlled by fetch unit 226, in a manner to be described in further detail hereinbelow.

Predecoding of the instructions is broken into two parts in microprocessor 210, namely predecode 0 stage 228 and predecode 1 stage 232. These two stages operate as separate pipeline stages, and together operate to locate up to three ×86 instructions and apply the same to decoder 234. As such, the predecode stage of the pipeline in microprocessor 210 is three instructions wide. Predecode 0 unit 228, as noted above, determines the size and position of as many as three ×86 instructions (which, of course, are variable length), and as such consists of three instruction recognizers; predecode 1 unit 232 recodes the multi-byte instructions into a fixed-length format, to facilitate decoding.

Decode unit 234, in this example, contains four instruction decoders, each capable of receiving a fixed length ×86 instruction from predecode 1 unit 232 and producing from one to three atomic operations (AOps); AOps are substantially equivalent to RISC instructions. Three of the four decoders operate in parallel, placing up to nine AOps into the decode queue at the output of decode unit 234 to await scheduling; the fourth decoder is reserved for special cases. Scheduler 236 reads up to four AOps from the decode queue at the output of decode unit 234, and assigns these AOps to the appropriate execution units. In addition, the operand unit 244 receives and prepares the operands for execution. As indicated in FIG. 8, operand unit 244 receives an input from scheduler 236 and also from microcode ROM 248, via multiplexer 245, and fetches register operands for use in the execution of the instructions. In addition, according to this example, operand unit 244 performs operand forwarding to send results to registers that are ready to be stored, and also performs address generation for AOps of the load and store type.

Microsequencer 248, in combination with microcode ROM 246, control ALUs 242 and load/store units 240 in the execution of microcode entry AOps, which are generally the last AOps to execute in a cycle. In this example, microsequencer 248 sequences through microinstructions stored in microcode ROM 246 to effect this control for those microcoded microinstructions. Examples of microcoded microinstructions include, for microprocessor 210, complex or rarely-used ×86 instructions, ×86 instructions that modify segment or control registers, handling of exceptions and interrupts, and multi-cycle instructions (such as REP instructions, and instructions that PUSH and POP all registers).

Microprocessor 210 also includes circuitry 224 for controlling the operation of JTAG scan testing, and of certain built-in self-test functions, ensuring the validity of the operation of microprocessor 210 upon completion of manufacturing, and upon resets and other events.

From the above, one skilled in art may appreciate various benefits of the present embodiments. For example, a microprocessor in accordance with the various embodiments may efficiently handle various external interrupts with a reduced amount of monitor program intervention. As a result, the overall number of clock cycles for various 8086 programs should be reduced when running in a virtual 8086 mode (or the like). As still another example, while the microprocessor of FIG. 8 depicts an exemplary microprocessor to benefit from the inventive embodiments, other microprocessor architectures could benefit as well. Indeed, these benefits and examples serve further to demonstrate that while the present embodiments have been described in detail, various substitutions, modifications or alterations could be made to the descriptions set forth above without departing from the inventive scope. Indeed, numerous examples have been cited above. In addition to those examples, the order of the many steps from the flow charts described above may in certain instances be arranged in different fashion, and certain of those steps may be removed while others are added. As another example, the states of the bits stated above are only by way of example and, therefore, changing those states may necessitate alternative logic structures. As yet another example, while registers have been shown as preferred storage devices, alternative storage structures (e.g., memory) could be used as well. As still another example, while the present embodiments have been described in connection with the 80×86 architecture as well as its virtual mode and the extension of the virtual mode, other architectures with their own forms of virtualization may benefit as well. As another example, although the inhibit function described above is preferable in instance 1 of Table 1 (i.e., VIF=1, IF=0), an alternative embodiment could be used to bypass the monitor program in that instance and use the on-chip hardware to set up the interrupt for the virtual 8086 program. As still another example, while various bits have been described as set by monitor program 34 (e.g., VIR_INTC, VIR_INTV), the on-chip hardware described above could be modified to include various additional circuitry and/or microcode to also set the values of these bits as well. Still other alternatives will be ascertainable by a person skilled in the art, and all of the above demonstrates the flexibility of the inventive scope which is defined by the following claims.

What is claimed is:

1. A microprocessor for multi-tasking a plurality of programs, wherein the plurality of programs comprise a virtual program operable in a virtual mode and a monitor program operable using protected mode semantics, said microprocessor comprising:

input circuitry for receiving an external interrupt request signal corresponding to an external interrupt directed to the virtual program;

input circuitry for receiving an external interrupt number corresponding to the external interrupt directed to the virtual program;

an interrupt handling circuit comprising circuitry for identifying an interrupt vector and presenting an interrupt corresponding to the external interrupt request number;

control circuitry coupled to said interrupt handling circuit, and comprising:

circuitry for detecting receipt of the external interrupt request signal;

circuitry, responsive to receipt of the external interrupt request signal and the external interrupt number, for providing a select signal to said interrupt handling circuit, wherein said interrupt handling circuit identifies the interrupt vector using protected mode semantics and presents an interrupt to the monitor program in response to the select signal comprising a first state, and wherein said interrupt handling circuit identifies the interrupt vector using a second set of semantics differing from the protected mode semantics and presents an interrupt to the virtual program in response to the select signal comprising a second state.

2. The microprocessor of claim 1 wherein said second set of semantics comprise real mode compatible semantics.

3. The microprocessor of claim 1:

wherein the external interrupt number comprises one of a plurality of possible interrupt numbers; and wherein said control circuitry comprises a plurality of memory bits operable to be set to a first state or a second state;

wherein each of said plurality of memory bits corresponds to one of said plurality of possible interrupt numbers; and wherein the state of each of said plurality of memory bits indicates the state of the select signal.

4. The microprocessor of claim 1:

wherein the external interrupt number comprises one of a plurality of possible interrupt numbers;

wherein said control circuitry comprises a plurality of dedicated register bits operable to be set to a first state or a second state;

wherein each of said plurality of dedicated register bits corresponds to one of said plurality of possible interrupt numbers; and wherein the state of each of said plurality of dedicated register bits indicates the state of the select signal.

5. The microprocessor of claim 1 wherein said interrupt handling circuit is responsive to receipt of said external interrupt request signal, and wherein said control circuitry further comprises:

an interrupt flag control signal, wherein said interrupt flag control signal is set in a first state to inhibit said interrupt handling circuit from responding to said external interrupt request signal, and wherein said interrupt control signal is set in a second state to enable said interrupt handling circuit to respond to said external interrupt request signal.

6. The microprocessor of claim 5 wherein said control circuitry further comprises:

a virtual interrupt flag control signal, wherein said virtual interrupt flag control signal is set in a first state to inhibit receipt of the external interrupt request signal by the virtual program, and wherein said virtual interrupt flag control signal is set a second state to enable receipt of the external interrupt request signal by the virtual program; and logic circuitry for outputting a control signal to said interrupt handling circuit, wherein in response to a combination of the interrupt flag control signal being in the second state and the virtual interrupt flag control signal being in the first state, said control signal causes said interrupt handling circuit to identify the interrupt vector using protected mode semantics and present the interrupt to the monitor program.

7. The microprocessor of claim 5 wherein said control circuitry further comprises:

a virtual interrupt flag control signal, wherein said virtual interrupt flag control signal is set in a first state to inhibit receipt of the external interrupt request signal by the virtual program, and wherein said virtual interrupt flag control signal is set a second state to enable receipt of the external interrupt request signal by the virtual program;

a virtual interrupt pending control signal, wherein said virtual interrupt pending control signal is set in a first state to indicate receipt of the external interrupt request signal corresponding to the external interrupt directed to the virtual program; and logic circuitry for presenting a prepare virtual interrupt request signal to said interrupt handling circuit in response to a combination of said virtual interrupt flag control signal in the second state and said virtual interrupt pending control signal being in the first state.

8. The microprocessor of claim 7 wherein, responsive to said prepare virtual interrupt request signal, said interrupt handling circuit identifies the interrupt vector using real mode compatible semantics.

9. The microprocessor of claim 8 wherein said control circuitry further comprises circuitry for storing a number corresponding to the external interrupt number.

10. The microprocessor of claim 9 and further comprising a bit for indicating whether or not the number stored in said circuitry for storing the external interrupt number is valid.

11. The microprocessor of claim 10 and further comprising:

circuitry for evaluating said bit for indicating whether or not the number stored in said circuitry for storing the external interrupt number is valid; and circuitry for passing control to the monitor program in response to determining that the number stored in said circuitry for storing the external interrupt number is not valid.

12. The microprocessor of claim 8 and further comprising:

a bit for indicating that the monitor program requests control of the microprocessor prior to execution of the interrupt vector;

circuitry for evaluating said bit for indicating that the monitor program requests control of the microprocessor prior to execution of the interrupt vector; and circuitry for passing control to the monitor program in response to determining that the monitor program requests control of the microprocessor prior to execution of the interrupt vector.

13. The microprocessor of claim 1 wherein said control circuitry further comprises circuitry for storing a number corresponding to the external interrupt number.

14. The microprocessor of claim 13 and further comprising a bit for indicating whether or not the number stored in said circuitry for storing the external interrupt number is valid.

15. The microprocessor of claim 14 and further comprising:

circuitry for evaluating said bit for indicating whether or not the number stored in said circuitry for storing the external interrupt number is valid; and circuitry for passing control to the monitor program in response to determining that the number stored in said circuitry for storing the external interrupt number is not valid.

16. The microprocessor of claim 1 and further comprising:

a bit for indicating that the monitor program requests control of the microprocessor prior to execution of the interrupt vector;

circuitry for evaluating said bit for indicating that the monitor program requests control of the microprocessor prior to execution of the interrupt vector; and circuitry for passing control to the monitor program in response to determining that the monitor program requests control of the microprocessor prior to execution of the interrupt vector.

17. A microprocessor for multi-tasking a plurality of programs, wherein the plurality of programs comprise a virtual program operable in a virtual mode and a monitor program operable using protected mode semantics, said microprocessor comprising:

input circuitry for receiving an external interrupt request signal corresponding to an external interrupt directed to the virtual program;

input circuitry for receiving an external interrupt number corresponding to the external interrupt directed to the virtual program;

an interrupt handling circuit comprising circuitry for identifying an interrupt vector and presenting an interrupt corresponding to the external interrupt request number;

control circuitry coupled to said interrupt handling circuit, and comprising:

circuitry for detecting receipt of the external interrupt request signal;

circuitry, responsive to receipt of the external interrupt request signal and the external interrupt number, for providing a select signal to said interrupt handling circuit, wherein said interrupt handling circuit identifies the interrupt vector using protected mode semantics and presents an interrupt to the monitor program in response to the select signal comprising a first state, and wherein said interrupt handling circuit identifies the interrupt vector using a second set of semantics differing from the protected mode semantics and presents an interrupt to the virtual program in response to the select signal comprising a second state, wherein said second set of semantics comprise real mode compatible semantics;

wherein the external interrupt number comprises one of a plurality of possible interrupt numbers;

wherein said control circuitry comprises a plurality of memory bits operable to be set to a first state or a second state;

wherein each of said plurality of memory bits corresponds to one of said plurality of possible interrupt numbers; and wherein the state of each of said plurality of memory bits indicates the state of the select signal.

18. The microprocessor of claim 17 wherein said interrupt handling circuit is responsive to receipt of said external interrupt request signal, and wherein said control circuitry further comprises:

an interrupt flag control signal, wherein said interrupt flag control signal is set in a first state to inhibit said interrupt handling circuit from responding to said external interrupt request signal, and wherein said interrupt control signal is set in a second state to enable said interrupt handling circuit to respond to said external interrupt request signal; and wherein said control circuitry further comprises:

a virtual interrupt flag control signal, wherein said virtual interrupt flag control signal is set in a first state to inhibit receipt of the external interrupt request signal by the virtual program, and wherein said virtual interrupt flag control signal is set a second state to enable receipt of the external interrupt request signal by the virtual program; and logic circuitry for outputting a control signal to said interrupt handling circuit, wherein in response to a combination of the interrupt flag control signal being in the second state and the virtual interrupt flag control signal being in the first state, said control signal causes said interrupt handling circuit to identify the interrupt vector using protected mode semantics and present the interrupt to the monitor program.

19. The microprocessor of claim 18 wherein said control circuitry further comprises:

a virtual interrupt pending control signal, wherein said virtual interrupt pending control signal is set in a first state to indicate receipt of the external interrupt request signal corresponding to the external interrupt directed to the virtual program; and logic circuitry for presenting a prepare virtual interrupt request signal to said interrupt handling circuit in response to a combination of said virtual interrupt flag control signal in the second state and said virtual interrupt pending control signal being in the first state.

20. The microprocessor of claim 8 wherein, responsive to said prepare virtual interrupt request signal, said interrupt handling circuit identifies the interrupt vector using real mode compatible semantics.

21. The microprocessor of claim 17:

wherein said control circuitry further comprises circuitry for storing a number corresponding to the external interrupt number; and further comprising:

a bit for indicating whether or not the number stored in said circuitry for storing the external interrupt number is valid;

circuitry for evaluating said bit for indicating whether or not the number stored in said circuitry for storing the external interrupt number is valid; and circuitry for passing control to the monitor program in response to determining that the number stored in said circuitry for storing the external interrupt number is not valid.

22. The microprocessor of claim 17 and further comprising:

a bit for indicating that the monitor program requests control of the microprocessor prior to execution of the interrupt vector;

circuitry for evaluating said bit for indicating that the monitor program requests control of the microprocessor prior to execution of the interrupt vector; and circuitry for passing control to the monitor program in response to determining that the monitor program requests control of the microprocessor prior to execution of the interrupt vector.

23. A microprocessor-based computer system, comprising:

an input interface;

a plurality of peripheral devices coupled to said input interface, wherein selected ones of said plurality of peripheral devices are operable to issue an external interrupt request signal;

a main memory; and a microprocessor for multi-tasking a plurality of programs, wherein the plurality of programs comprise a virtual program operable in a virtual mode and a monitor program operable using protected mode semantics, said microprocessor comprising:

input circuitry for receiving the external interrupt request signal corresponding to an external interrupt directed to the virtual program;

input circuitry for receiving an external interrupt number corresponding to the external interrupt directed to the virtual program;

an interrupt handling circuit comprising circuitry for identifying an interrupt vector and presenting an interrupt corresponding to the external interrupt request number;

control circuitry coupled to said interrupt handling circuit, and comprising:

circuitry for detecting receipt of the external interrupt request signal;

circuitry, responsive to receipt of the external interrupt request signal and the external interrupt number, for providing a select signal to said interrupt handling circuit, wherein said interrupt handling circuit identifies the interrupt vector using protected mode semantics and presents an interrupt to the monitor program in response to the select signal comprising a first state, and wherein said interrupt handling circuit identifies the interrupt vector using a second set of semantics differing from the protected mode semantics and presents an interrupt to the virtual program in response to the select signal comprising a second state.

24. The system of claim 23 wherein said second set of semantics comprise real mode compatible semantics.

25. The system of claim 23:
wherein the external interrupt number comprises one of a plurality of possible interrupt numbers; and
wherein said control circuitry comprises a plurality of memory bits operable to be set to a first state or a second state;
wherein each of said plurality of memory bits corresponds to one of said plurality of possible interrupt numbers; and
wherein the state of each of said plurality of memory bits indicates the state of the select signal.

26. The system of claim 23:
wherein the external interrupt number comprises one of a plurality of possible interrupt numbers;
wherein said control circuitry comprises a plurality of dedicated register bits operable to be set to a first state or a second state;
wherein each of said plurality of dedicated register bits corresponds to one of said plurality of possible interrupt numbers; and
wherein the state of each of said plurality of dedicated register bits indicates the state of the select signal.

27. The system of claim 23 wherein said interrupt handling circuit is responsive to receipt of said external interrupt request signal, and wherein said control circuitry further comprises:
an interrupt flag control signal, wherein said interrupt flag control signal is set in a first state to inhibit said interrupt handling circuit from responding to said external interrupt request signal, and wherein said interrupt control signal is set in a second state to enable said interrupt handling circuit to respond to said external interrupt request signal.

28. The system of claim 27 wherein said control circuitry further comprises:
a virtual interrupt flag control signal, wherein said virtual interrupt flag control signal is set in a first state to inhibit receipt of the external interrupt request signal by the virtual program, and wherein said virtual interrupt flag control signal is set a second state to enable receipt of the external interrupt request signal by the virtual program; and
logic circuitry for outputting a control signal to said interrupt handling circuit, wherein in response to a combination of the interrupt flag control signal being in the second state and the virtual interrupt flag control signal being in the first state, said control signal causes said interrupt handling circuit to identify the interrupt vector using protected mode semantics and present the interrupt to the monitor program.

29. The system of claim 27 wherein said control circuitry further comprises:

a virtual interrupt flag control signal, wherein said virtual interrupt flag control signal is set in a first state to inhibit receipt of the external interrupt request signal by the virtual program, and wherein said virtual interrupt flag control signal is set a second state to enable receipt of the external interrupt request signal by the virtual program;
a virtual interrupt pending control signal, wherein said virtual interrupt pending control signal is set in a first state to indicate receipt of the external interrupt request signal corresponding to the external interrupt directed to the virtual program; and
logic circuitry for presenting a prepare virtual interrupt request signal to said interrupt handling circuit in response to a combination of said virtual interrupt flag control signal in the second state and said virtual interrupt pending control signal being in the first state.

30. The system of claim 29 wherein, responsive to said prepare virtual interrupt request signal, said interrupt handling circuit identifies the interrupt vector using real mode compatible semantics.

31. The system of claim 30 wherein said control circuitry further comprises circuitry for storing a number corresponding to the external interrupt number.

32. The system of claim 31 wherein said microprocessor further comprises a bit for indicating whether or not the number stored in said circuitry for storing the external interrupt number is valid.

33. The system of claim 32 wherein said microprocessor further comprises:
circuitry for evaluating said bit for indicating whether or not the number stored in said circuitry for storing the external interrupt number is valid; and
circuitry for passing control to the monitor program in response to determining that the number stored in said circuitry for storing the external interrupt number is not valid.

34. The system of claim 23 wherein said microprocessor further comprises:
a bit for indicating that the monitor program requests control of the microprocessor prior to execution of the interrupt vector;
circuitry for evaluating said bit for indicating that the monitor program requests control of the microprocessor prior to execution of the interrupt vector; and
circuitry for passing control to the monitor program in response to determining that the monitor program requests control of the microprocessor prior to execution of the interrupt vector.

35. The system of claim 23 wherein said control circuitry further comprises circuitry for storing a number corresponding to the external interrupt number.

36. The system of claim 35 wherein said microprocessor further comprises a bit for indicating whether or not the number stored in said circuitry for storing the external interrupt number is valid.

37. The system of claim 36 wherein said microprocessor further comprises:
circuitry for evaluating said bit for indicating whether or not the number stored in said circuitry for storing the external interrupt number is valid; and
circuitry for passing control to the monitor program in response to determining that the number stored in said circuitry for storing the external interrupt number is not valid.

38. The system of claim 23 wherein said microprocessor further comprises:

a bit for indicating that the monitor program requests control of the microprocessor prior to execution of the interrupt vector;

circuitry for evaluating said bit for indicating that the monitor program requests control of the microprocessor prior to execution of the interrupt vector; and circuitry for passing control to the monitor program in response to determining that the monitor program requests control of the microprocessor prior to execution of the interrupt vector.

\* \* \* \* \*